United States Patent
Oh et al.

(10) Patent No.: US 9,742,016 B2
(45) Date of Patent: Aug. 22, 2017

(54) FUEL CELL STARTUP APPARATUS AND METHOD

(71) Applicant: Hyundai Motor Company, Seoul (KR)

(72) Inventors: Dong Jo Oh, Gyeonggi-do (KR); Jong Hyun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 303 days.

(21) Appl. No.: 14/138,988

(22) Filed: Dec. 23, 2013

(65) Prior Publication Data

US 2015/0064582 A1 Mar. 5, 2015

(30) Foreign Application Priority Data

Sep. 5, 2013 (KR) ........................ 10-2013-0106859

(51) Int. Cl.
| | | |
|---|---|---|
| *H01M 8/04* | (2016.01) | |
| *H01M 8/04223* | (2016.01) | |
| *H01M 8/04225* | (2016.01) | |
| *H01M 8/04955* | (2016.01) | |
| *H01M 8/04119* | (2016.01) | |
| *H01M 8/04746* | (2016.01) | |

(52) U.S. Cl.
CPC ... *H01M 8/04231* (2013.01); *H01M 8/04225* (2016.02); *H01M 8/04126* (2013.01); *H01M 8/04753* (2013.01); *H01M 8/04955* (2013.01)

(58) Field of Classification Search
None
See application file for complete search history.

(56) References Cited

U.S. PATENT DOCUMENTS

| | | | | |
|---|---|---|---|---|
| 2002/0136942 A1* | 9/2002 | Kashiwagi | ........ | H01M 8/04089 429/415 |
| 2004/0219406 A1* | 11/2004 | Sugawara | ........ | H01M 8/04097 429/432 |
| 2008/0182138 A1 | 7/2008 | Salvador et al. | | |
| 2013/0209908 A1* | 8/2013 | Furusawa | ........ | H01M 8/04231 429/429 |

FOREIGN PATENT DOCUMENTS

| | | |
|---|---|---|
| JP | 2002-260698 A | 9/2002 |
| JP | 2004039527 A | 2/2004 |
| JP | 2005085662 A | 3/2005 |
| JP | 2006161695 A | 6/2006 |
| JP | 2007242339 A | 9/2007 |
| JP | 2007317552 A | 12/2007 |

(Continued)

OTHER PUBLICATIONS

Machine translation of JP 2002-260698, Sep. 2002.*

*Primary Examiner* — Jonathan Crepeau
(74) *Attorney, Agent, or Firm* — Mintz Levin Cohn Ferris Glovsky and Popeo, P.C.; Peter F. Corless

(57) ABSTRACT

A fuel cell startup apparatus and method reduces high-voltage generation and corrosion of a cathode electrode that may occur because the density of oxygen is locally high in a cell near a central flow distributor after long-term parking of a fuel-cell vehicle. To this end, density control gas is selectably injected into a fuel supply line prior to supply of reaction gas of hydrogen and air in a fuel cell startup process after long-term parking to forcedly mix anode-side gas in the fuel supply line and the cell with the density control gas.

4 Claims, 6 Drawing Sheets

(56) References Cited

FOREIGN PATENT DOCUMENTS

| | | | |
|---|---|---|---|
| JP | 2008066184 | A | 3/2008 |
| JP | 2008078140 | A | 4/2008 |
| JP | 2009-301868 | A | 12/2009 |
| JP | 2012104355 | A | 5/2012 |
| JP | 2012-142190 | A | 7/2012 |
| JP | 2013-077582 | A | 4/2013 |
| WO | 2004062060 | A2 | 7/2004 |

\* cited by examiner

<PRIOR ART>

<PRIOR ART>

FUEL CELL STARTUP APPARATUS AND METHOD

CROSS-REFERENCE TO RELATED APPLICATION

This application claims under 35 U.S.C. §119(a) the benefit of Korean Patent Application No. 10-2013-0106859 filed on Sep. 5, 2013, the entire contents of which are incorporated herein by reference.

BACKGROUND (a) Technical Field

The present disclosure relates to a fuel cell startup apparatus and method, and more particularly, to a fuel cell startup apparatus and method which may solve problems of high-voltage generation and cathode electrode corrosion, caused by oxygen locally concentrated on a cell near a central flow distributor after long-term parking of a fuel-cell vehicle.

(b) Background Art

A main power source of a fuel-cell vehicle is a power-generating device called a 'fuel-cell stack'. In this device, the fuel cell converts chemical energy from typically hydrogen into electric energy through an electrochemical reaction in the stack, instead of converting the chemical energy into heat through combustion.

One known type of fuel cell is a Polymer Electrolyte Membrane Fuel Cell (PEMFC), which has been widely studied as a power source for driving a vehicle. In particular, a PEMFC typically includes a Membrane Electrode Assembly (MEA) in which on both sides of an electrolyte membrane where protons move therethrough, catalyst electrode layers are attached which operates as the electrochemical reaction area. Additionally, the PEMFC also includes a Gas Diffusion Layer (GDL) which uniformly distributes reaction gas and transfers generated electric energy, and a bipolar plate which provides a path for the reaction gas for reaction and a coolant for cooling the fuel cell.

In the fuel cell, through a flow path in the bipolar plate, hydrogen as the fuel and oxygen (air) as an oxidizer are supplied to an anode and a cathode of the MEA, respectively, such that hydrogen is supplied to the anode (also called a fuel electrode, a hydrogen electrode, or an oxidation electrode) and oxygen (air) is supplied to the cathode (also called an air electrode, an oxygen electrode, or a reduction electrode).

Hydrogen supplied to the anode is resolved into protons ($H^+$) and electrons ($e^-$), among which only the protons selectively pass through the electrolyte membrane, which is a cation exchange membrane, and are delivered to the cathode and the electrons are delivered to the cathode through the GDL and the bipolar plate that are conductors.

In the cathode, the protons supplied through the electrolyte membrane and the electrons delivered through the bipolar plate come in contact with oxygen in the air supplied to the cathode by an air supply device, thus producing water. Due to movement of the protons in this state, the protons flow through an external conducting line, and such a flow of the electrons produce current.

As illustrated in FIG. 1, a fuel cell system applied to the fuel-cell vehicle includes a hydrogen supply device 10 for supplying hydrogen, which is operating as the fuel, to a fuel-cell stack 1, an air supply device 20 for supplying air including oxygen, which is operating as an oxidizer for electrochemical reaction, to the fuel-cell stack 1, and a hydrogen recirculation device 16 for recirculating non-reaction hydrogen exhausted from an anode outlet of the fuel-cell stack 1 into an anode inlet to reusing the hydrogen. With hydrogen recirculation, the distribution of a reagent in the stack 1 becomes uniform due to an increase in the flow rate of hydrogen in the stack 1, thus obtaining uniform cell voltage distribution and stably operating the stack 1.

Further describing the system shown in FIG. 1, high-pressure hydrogen supplied to the hydrogen supply device 10 from a hydrogen storage unit (for example, a hydrogen tank) 11 sequentially passes through a hydrogen supply valve 13 and a regulator 14 of a hydrogen supply line 12, and then is supplied to the fuel-cell stack 1 through a central flow distributor (not shown). The air supplied by an air blower 22 in the air supply device 20 passes through a humidifying device 23 and is supplied to the fuel-cell stack 1. Additionally, in at least one of an air supply line 21 and a cathode exhaust line 24 connected to cathode inlet/outlet of the fuel-cell stack 1, an air cutoff valve (not shown) is installed.

In some instances, the air cutoff value may become frozen during winter months, and thus in the fuel cell startup process, the state of the air cutoff valve is checked to determine whether the air cutoff valve is frozen.

As such, to start up the fuel cell in the fuel-cell system, hydrogen (fuel gas), which is reaction gas, air (oxidation gas) should be supplied to the fuel-cell stack. FIG. 2 is a flowchart showing a conventional fuel-cell startup process. Referring to FIG. 2, in the general fuel-cell startup process, the state of the air cutoff valve is checked in a startup standby state, and then hydrogen, which is fuel, is supplied from the hydrogen supply device to the fuel-cell stack. Thereafter, the hydrogen recirculation device (including a recirculation blower) is driven, the air supply device supplies humidified air, which is humidified by a humidifying device, to the fuel-cell stack, and then a stack voltage is checked, thus completing the startup process.

The central flow distributor connects supply and exhaust lines for hydrogen and air and supply and exhaust lines for a coolant to a manifold of the fuel-cell stack to efficiently supply and exhaust hydrogen, air, and the coolant to each unit cell of the fuel-cell stack. However, during long-term parking of the fuel-cell vehicle, external air may be introduced into the cathode of the fuel-cell stack through a crack such as a pipe connected with the fuel-cell stack, and the air (oxygen) introduced into the cathode may be introduced into the anode through the electrolyte membrane. Therefore, when the fuel cell is started up when air (oxygen) exists in the anode, a high voltage higher than a general cell voltage (for example, 1V) is formed in an interface between oxygen and hydrogen, degrading performance of the electrode.

In particular, in the case of long-term parking, air is typically introduced through the central flow distributor connected to the manifold of the fuel-cell stack, such that in a cell near the central flow distributor, the density of oxygen in the anode is higher than in other cells, and as a result, high-voltage generation is concentrated in a re-startup process, causing extensive damage to the cell near the central flow distributor.

That is, in case of long-term parking, the density of oxygen is locally quite high in the cell near the central flow distributor that is close to the pipe, intensifying high-voltage generation in that cell and thus significantly degrading performance of that cell.

Moreover, if too much high voltage is generated at startup, the thickness of the cathode electrode is reduced. In terms of one cell, the external air is mainly introduced through Air out shown in FIG. 3 and thus the density of oxygen is highest near Air out. Eventually, during re-startup, due to a high potential formed in the cathode near Air out, a carbon support can become corroded, thus reducing the thickness of the cathode electrode.

In summation, in the case of long-term parking, air is introduced into the cathode of the fuel-cell stack, and the air in the cathode moves to the anode through the electrolyte membrane, such that if the fuel cell is started up when air remains in the anode, the carbon support can become corroded, thereby reducing the thickness of the cathode electrode.

The fuel-cell stack has a structure in which unit cells are electrically connected in series, and as a result, performance of the fuel-cell stack is limited by each particular cell whose performance is degraded. Consequently, repair of the stack may be required according to performance variation between cells.

SUMMARY OF THE DISCLOSURE

Accordingly, various aspects of the present invention provide a fuel cell startup apparatus and method which effectively prevents a high-voltage from being generated and thereby corrosion of a cathode electrode from occurring when the density of oxygen increases locally in a cell near a central flow distributor after long-term parking of a fuel-cell vehicle.

According to one of various aspects of the present invention, there is provided a fuel cell startup method including operating a density control gas supply that supplies density control gas to an anode of a fuel-cell stack and forcedly mixes anode-side gas in a cell of the fuel-cell stack with the density control gas and a fuel and oxidation gas supply that supplies a fuel gas and an oxidation gas which are necessary for electrochemical reaction to the fuel-cell stack.

According to another one of various aspects of the present invention, there is provided a fuel-cell startup apparatus including a controller configured to output a control signal to supply density control gas and a density control gas supply that supplies according to a control signal of the controller to control the density control gas to an anode of a fuel-cell stack, in which in fuel-cell startup, the controller selectably operates the density control gas supply before supplying fuel gas and oxidation gas, which are required for electrochemical reaction, to the fuel-cell stack, to forcedly mix anode-side gas in a cell of the fuel-cell stack with the density control gas.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

Figure 1:
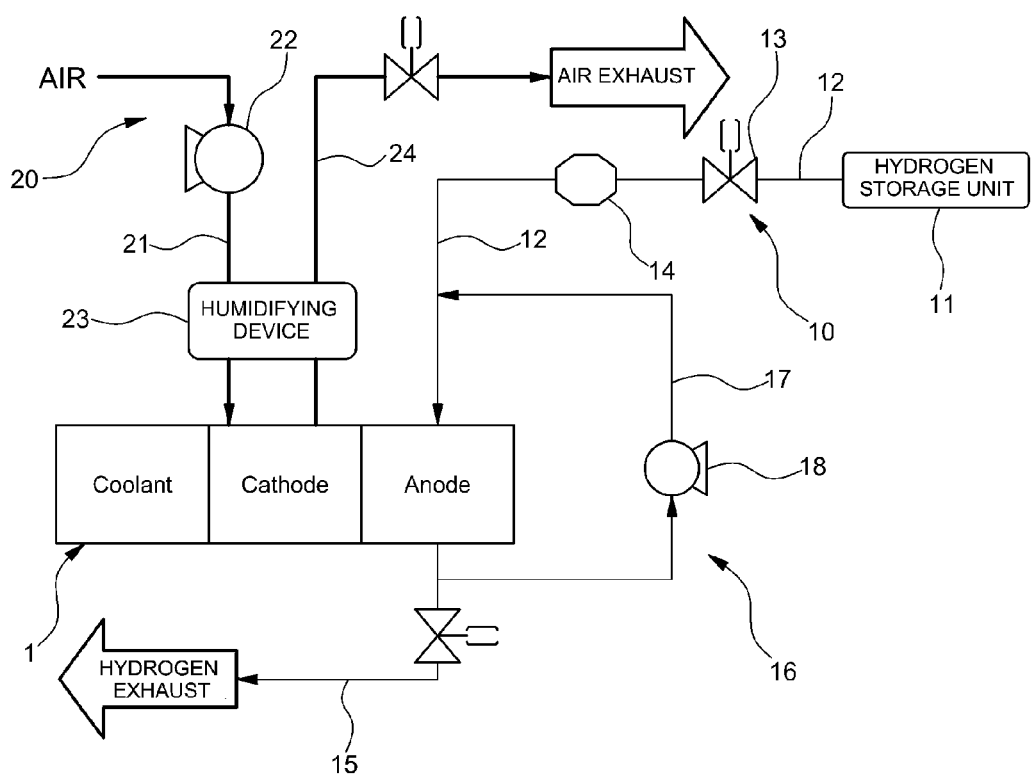
FIG. 1 is a diagram showing a fuel-cell system.

Hereinafter, the present invention will be described in detail with reference to the accompanying drawings to allow those of ordinary skill in the art to easily carry out the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention relates to a fuel cell startup method for solving conventional problems that may occur in startup after long-term parking of a fuel-cell vehicle, that is, problems related to high-voltage generation and electrode corrosion.

As described before, in case of long-term parking of a fuel-cell vehicle, external air may be introduced into the fuel-cell stack through a crack in a pipe, and the density of oxygen is locally increased in a cell near a central flow distributor that is close to the pipe due to introduction of the external air. As a result, in startup of a fuel cell, due to high oxygen density in a cell near the central flow distributor, high-voltage generation may become concentrated and corrosion of a cathode electrode may occur.

To solve this problem, after long-term parking, at the time of startup of the fuel cell, it is necessary to reduce the density of oxygen locally concentrated in the cell near the central flow distributor and a startup process for leveling down the density of oxygen over the whole cells of the stack is required.

During long-term parking of the fuel-cell vehicle, external air introduced to the cathode of the cell moves to the anode through the electrolyte membrane and if the fuel cell is started up (reaction gas is supplied) when oxygen exists in the anode, a high voltage higher than a general cell voltage (for example, 1V) is formed, degrading performance of the electrode.

In this case, the high voltage increases in proportion to the density of oxygen in the anode, and thus if oxygen in the anode is diluted before the reaction gas is supplied for startup of the fuel cell, formation of the high voltage may be prevented.

Moreover, since the density of oxygen is increased in the cell near the central flow distributor after long-term parking, if the density of oxygen over the whole cells is lowered by lowering the density of oxygen in the cell near the central flow distributor in startup of the fuel cell, high-voltage generation and its resulting electrode corrosion may be prevented.

In this regard, the present invention provides a fuel-cell startup process and apparatus for selectably supplying density control gas to a fuel-cell stack before supplying reaction gas during re-startup of a fuel-cell system after long-term parking of a fuel-cell vehicle.

Figure 4:
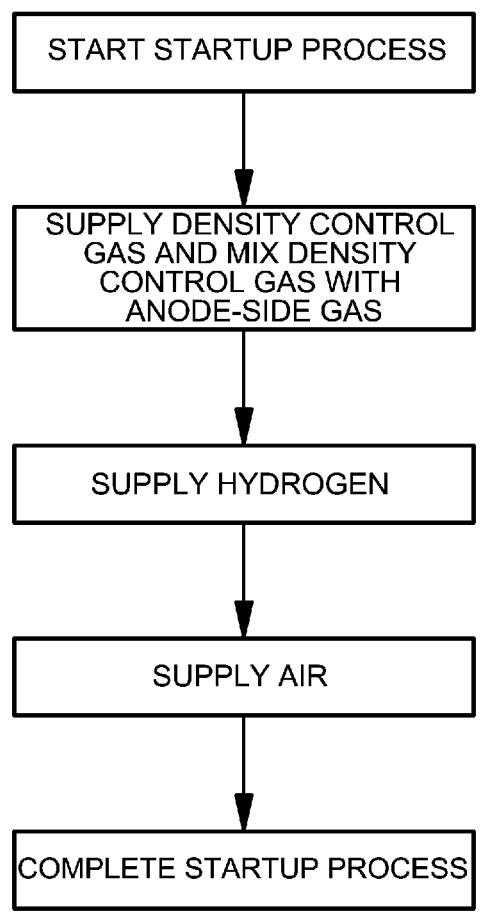
FIG. 4 is a flowchart showing a fuel-cell startup process according to an exemplary embodiment of the present invention.

FIG. 4 is a flowchart showing a fuel-cell startup process according to the present invention. In the present invention, in fuel-cell startup, density control gas is selectably supplied to an anode inlet of the fuel-cell stack (1 of FIG. 1), and then reaction gas necessary for electrochemical reaction (fuel-cell reaction), that is, hydrogen as a fuel gas and air as an oxidation gas are supplied.

To this end, the fuel-cell startup apparatus according to the present invention may include a density control density control gas supply that supplies density control gas to an anode inlet of a fuel-cell stack and a controller configured to operate the density control density control gas supply to selectably supply the density control gas to the anode inlet of the fuel-cell stack before supplying reaction gas (fuel gas and oxidation gas) necessary for electrochemical reaction (fuel-cell reaction) in fuel-cell startup.

Herein, the controller may be a fuel-cell system controller for controlling operations of the hydrogen supply device and the air supply device (operations of various valves, an air blower, and a recirculation blower) to control supply and cutoff of the reaction gas while controlling a startup process and a shutdown process of the fuel-cell system.

The density control gas is supplied to be mixed with anode-side gas in the cell of the fuel-cell stack such that at the time of fuel-cell startup, the density control gas is supplied into the cell through an anode inlet of the fuel-cell stack before the reaction gas is supplied, thus diluting oxygen concentrated in the cell near the central flow distributor and globally reducing the density of oxygen over the whole cells of the stack.

In the present invention, the density control gas supply may be a device of an existing fuel-cell system, which may supply the density control gas for controlling the density of the anode-side gas in the cell of the fuel-cell stack to the anode inlet of the fuel-cell stack, or may be a device separately provided in the fuel-cell system to supply the density control gas to the anode inlet of the fuel-cell stack.

In an embodiment of the present invention, the density control gas supply may use the device of the existing fuel-cell system without a departing from the overall installation of new hardware and in this case, the density control gas supply may be a hydrogen recirculation device 16 including a hydrogen recirculation line 17 and a recirculation blower 18 installed in the hydrogen recirculation line 17.

Referring to FIG. 1, the hydrogen recirculation line 17 is a pipe connecting from an anode-side exhaust line 15 of the fuel-cell stack 1 to the fuel supply line 12, and the recirculation blower 18 is a feeding unit that is driven according to a control signal of a controller (not shown) to supply gas (gas fed in from the cell of the stack through the anode outlet) of the anode-side exhaust line 15 of the fuel-cell stack 1 to the anode inlet of the fuel-cell stack 1.

In the current embodiment, the hydrogen recirculation device 16 operates under control of the controller during startup of the fuel cell before the reaction gas is supplied. To this end, the anode-side gas in the cell of the fuel-cell stack 1 is fed in through the anode outlet and is supplied to the anode inlet. In this case, the gas to be supplied from the anode outlet to the anode inlet is the density control gas.

Figure 2:
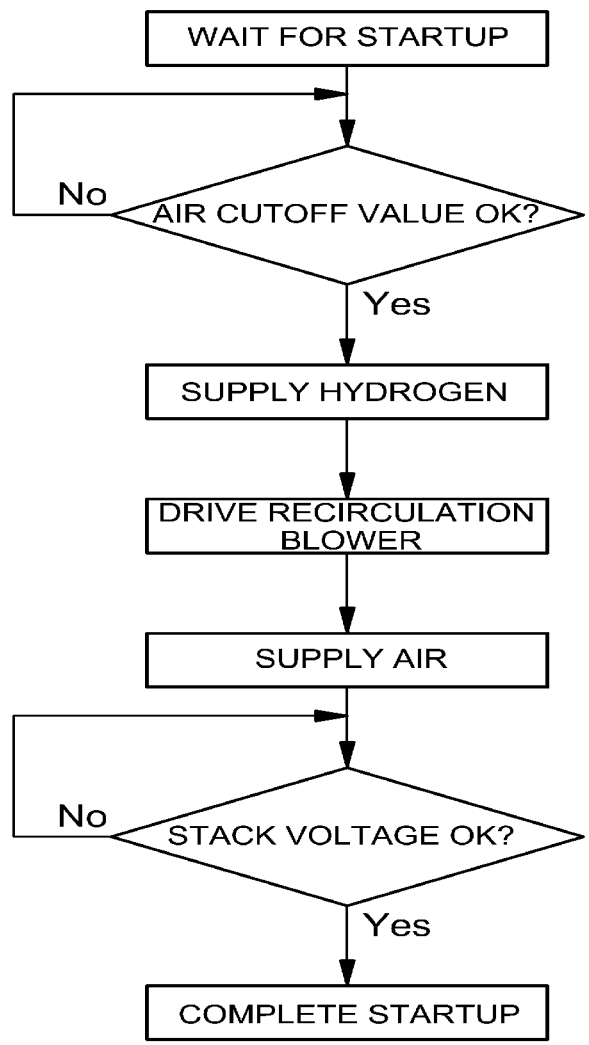
FIG. 2 is a flowchart showing a conventional fuel-cell startup process.
Figure 3:
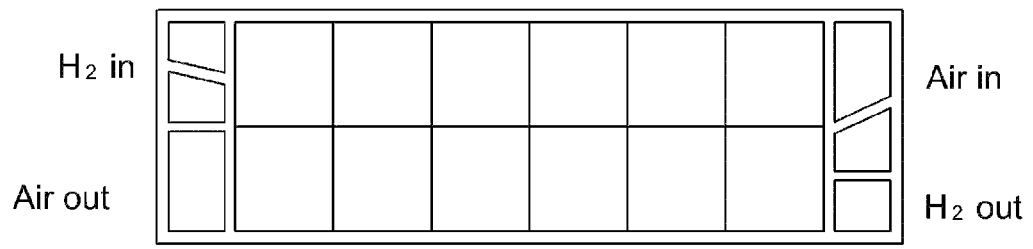
FIG. 3 is a diagram showing an air outlet in a unit cell of a fuel cell.
Figure 5:
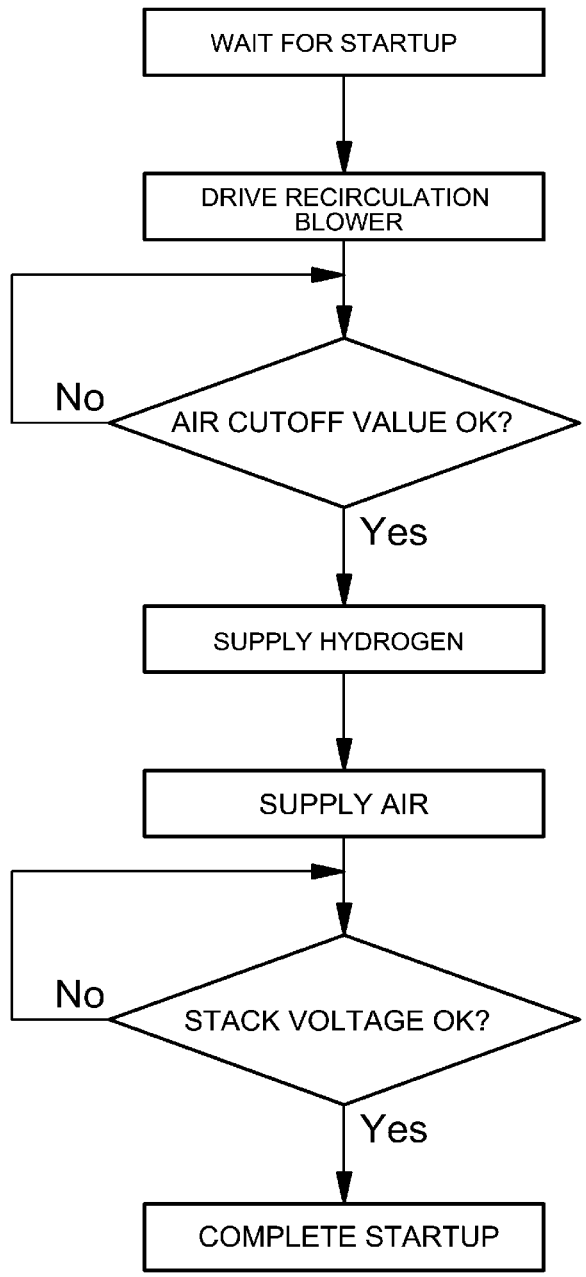
FIG. 5 is a flowchart showing a fuel-cell startup process according to an exemplary embodiment of the present invention in which a density control gas is supplied using a recirculation blower.

FIG. 5 is a flowchart showing a fuel-cell startup process of controlling the density of oxygen in the anode by using the hydrogen recirculation device 16 to prevent high-voltage generation and electrode corrosion. Conventionally, hydrogen is supplied in fuel-cell startup and the recirculation blower 18 is driven (see FIG. 2), but in the present invention, the recirculation blower 18 is first driven under control of the controller and then hydrogen and air are supplied as reaction gas (see FIG. 5).

As such, once the recirculation blower 18 is driven during the startup process, the recirculation blower 18 maintains a driving state to recirculate non-reaction hydrogen to the anode inlet of the fuel-cell stack 1 continuously during fuel-cell operation after completion of the startup.

If the recirculation blower 18 is driven prior to supply of the reaction gas, nitrogen and air in the anode side of the fuel-cell stack 1 may be supplied to the anode inlet of the stack 1 as the density control gas, and this density control gas may be forcedly mixed with oxygen concentrated in the cell (first cell) near the central flow distributor to dilute the concentrated oxygen and may generate a gas flow that pushes the oxygen that locally exists in the anode channel of the stack 1 to level down the density of the oxygen over the whole cells of the stack 1.

Eventually, merely with simple logic change in which the driving start point of the recirculation blower 18 is changed to a point prior to hydrogen supply in fuel-cell startup, the density control gas for preventing high-voltage generation in the fuel-cell stack 1 may be supplied, thus preventing high-voltage generation and electrode corrosion caused by oxygen of high density in the cell of the stack 1.

Figure 6:
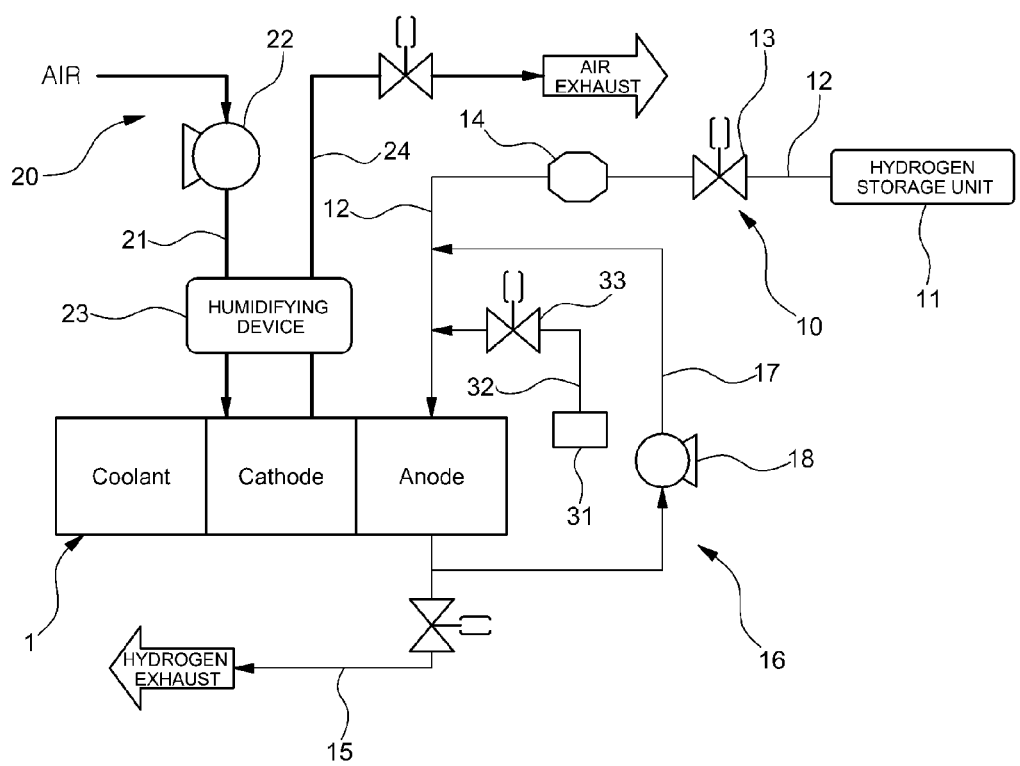
FIG. 6 is a diagram showing a fuel-cell system according to another exemplary embodiment of the present invention.

In another embodiment of the present invention, the density control density control gas supply may be a device separately provided in the fuel-cell system to supply the density control gas to the anode inlet of the fuel-cell stack 1, and a structure of the fuel-cell system using the density control density control gas supply is as shown in FIG. 6.

As shown in FIG. 6, the density control density control gas supply for supplying the density control gas may include a supply unit 31 for storing and supplying the density control gas, a gas supply line 32 connected from the supply unit 31 to the anode inlet of the fuel-cell stack 1, and a valve 33 installed in the gas supply line 32 to be opened or closed according to a control signal of the controller.

In some exemplary embodiments of the present invention, the density control gas may be an inert gas such as nitrogen, and the valve 33 may be opened by a control signal from the controller to allow the density control gas stored in the supply unit 31 to be supplied to the anode inlet of the fuel-cell stack 1 through the gas supply line 32 in fuel-cell startup.

The anode inlet to which the gas supply line 32 is connected may be the fuel supply line (hydrogen supply line) 12 connected to the anode inlet (inlet manifold) of the fuel-cell stack 1. Herein, the fuel supply line 12 needs to be interpreted as including a flow path in the central flow distributor for supplying fuel to the fuel-cell stack 1 and a fuel supply pipe connected from the hydrogen storage unit 11 to the central flow distributor in the system to which the central flow distributor (not shown) is applied.

That is, the gas supply line 32 may be connected to the central flow distributor installed to communicate with the inlet manifold of the fuel-cell stack 1, such that the gas supply line 32 may be connected to the fuel supply flow path in the central flow distributor or to the fuel supply pipe connected from the hydrogen storage unit 11 to the central flow distributor.

In this structure, the controller controls the operation of the valve 33 during startup of the fuel cell to supply the density control gas to the fuel-cell stack 1 for a predetermined time (e.g., less than or equal to one minute). In this state, oxygen in the cell may be diluted by the supplied density control gas or the density of the oxygen over the whole cells may be leveled down.

Herein, the controller may be configured to supply the density control gas to the stack 1 only when startup is performed after long-term parking of a predetermined time or more. That is, in fuel-cell startup, the controller determines whether a predetermined time has elapsed from fuel-cell shutdown, and if the controller determines that the startup is performed after elapse of the predetermined time (after long-term parking), then the controller controls the operation of the density control gas supply (that is, open the valve for a predetermined time) to supply the density control gas. In this way, control logic may be configured.

As is apparent from the foregoing description, in the fuel-cell startup apparatus and method according to the present invention, in a fuel-cell startup process after long-term parking, the density control gas is selectably fed into the fuel supply line before reaction gas of hydrogen and air is supplied to be forcedly mixed with the anode-side gas in the fuel supply line and the cell, thus making gas of uniform density.

Consequently, it is possible to prevent centration of high-voltage generation in the cell near the central flow distributor (disperse and weaken concentration of high-voltage generation over the entire stack) and reduce corrosion of the cathode electrode.

While the embodiments of the present invention have been described in detail, the scope of the present invention is not limited to the foregoing embodiment and various modifications and improves made by those of ordinary skill in the art using the basic concept of the present invention defined in the appended claims are also included in the scope of the present invention.

[Description of Reference Numerals]

| | |
|---|---|
| 1: Fuel Cell Stack | 10: Hydrogen Supply Device |
| 11: Hydrogen Storage Unit | 12: Hydrogen Supply Line |
| 13: Hydrogen Supply Valve | 14: Regulator |
| 15: Anode-Side Exhaust Line | 16: Hydrogen Recirculation Device |
| 17: Hydrogen Recirculation Line | 18: Recirculation Blower |
| 20: Air Supply Device | 21: Air Supply Line |
| 22: Air Blower | 23: Humidifying Device |
| 24: Cathode Exhaust Line | 31: Supply Unit |
| 32: Gas Supply Line | 33: Valve |

What is claimed is:

1. A fuel cell startup method comprising:
   operating, by a controller, a density control gas supply to supply density control gas to an anode of a fuel-cell stack and to forcedly mix anode-side gas in a cell of the fuel-cell stack with the density control gas while cutting off a fuel and oxidation gas supply; and
   subsequently to supplying the density control gas to the anode, supplying a fuel gas and an oxidation gas to the fuel-cell stack,
   wherein the density control gas supply is a hydrogen recirculation device and the density control gas is supplied from an anode-side exhaust line of the fuel-cell stack to a fuel supply line by the hydrogen recirculation device.

2. The fuel cell startup method of claim 1, wherein a recirculation blower of the hydrogen recirculation device is driven to selectably supply gas fed in the anode-side exhaust line of the fuel-cell stack to the fuel supply line and then the fuel gas and the oxidation gas are supplied to the fuel-cell stack.

3. A fuel-cell startup apparatus comprising:
   a controller programmed to output a control signal to supply density control gas; and
   a density control gas supply operating according to a control signal from the controller to control the density control gas to an anode of a fuel-cell stack,
   wherein, during fuel-cell startup, while a fuel gas and oxidation gas supply are cut off, the controller is programmed to selectably operate the density control gas supply before supplying fuel gas and oxidation gas, which are required for electrochemical reaction, to the fuel-cell stack, to forcedly mix anode-side gas in a cell of the fuel-cell stack with the density control gas,
   wherein the density control gas supply is a hydrogen recirculation device and the density control gas is supplied from an anode-side exhaust line of the fuel-cell stack to a fuel supply line by the hydrogen recirculation device.

4. The fuel-cell startup apparatus of claim 3, wherein the controller first drives a recirculation blower of the hydrogen recirculation device before supplying the fuel gas and the oxidation gas.

* * * * *